June 30, 1953          R. D. PIKE          2,643,936
METHOD FOR MAKING NITRIC OXIDE
Filed March 18, 1950
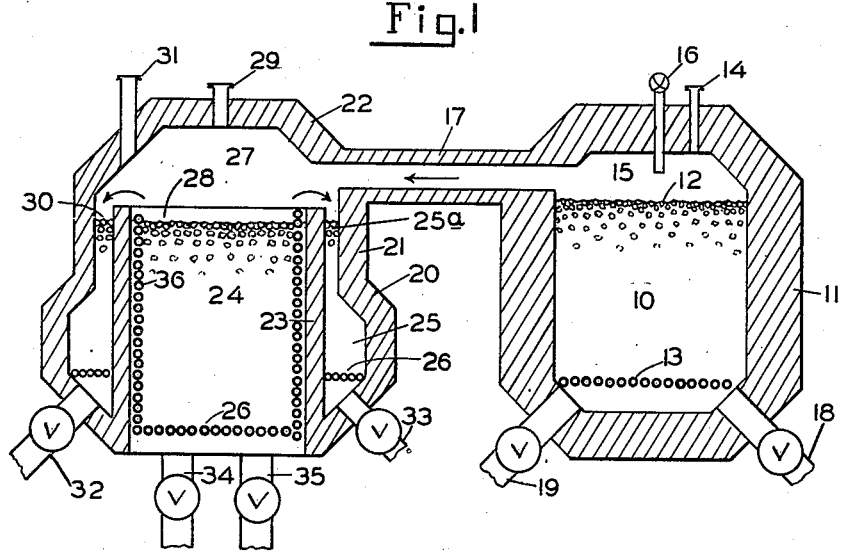
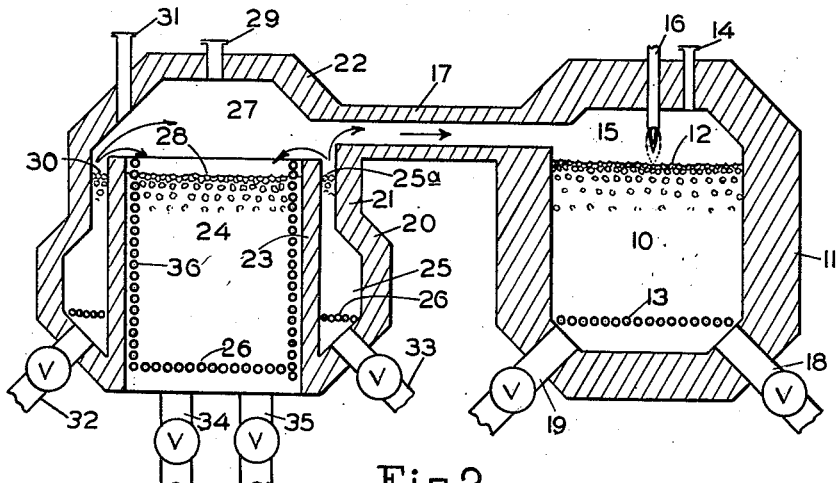
*INVENTOR.*
ROBERT D. PIKE
BY *Hammond Littell*

Patented June 30, 1953

2,643,936

UNITED STATES PATENT OFFICE 2,643,936

METHOD FOR MAKING NITRIC OXIDE

Robert D. Pike, Greenwich, Conn.

Application March 18, 1950, Serial No. 150,409

8 Claims. (Cl. 23—163)

This invention is a continuation-in-part of my application Serial No. 786,972, filed November 19, 1947.

Attempts to produce nitric oxide in fuel fired furnaces prior to said copending application have been characterized by the use of symmetrical cycles of substantial uniformity in the heating and cooling of the gases flowing through the furnaces and by the use of refractory particles of small diameter whereby the hot nitric oxide containing gases are cooled by the transfer of heat from the gases to the solid refractory particles in channels of small mean hydraulic radius.

I have found that better yields and better furnace operation can be secured by a completely nonsymmetrical operation of the furnaces in which certain portions of the furnaces are cooled and other portions heated in one portion of the cycle and nitric oxide produced in another and different portion of the cycle, as hereinafter described, and by cooling the hot nitric oxide containing gases by transfer of heat from a gas to a gas and thence to the solid refractory particles whereby larger refractory particles may be used throughout the furnaces with less complications in the operation of the furnaces, less resistance to gas flow through the furnaces and less danger of clogging of the passages through the refractory particles in the furnaces.

Like the invention described in said copending application, my present invention comprises a completely nonsymmetrical operation, in which I employ two furnaces, one of which is particularly adapted to the high temperature step of my process and the other one of which is particularly adapted to the chilling step in a pebble bed assisted by recycled relatively cold nitric oxide containing gas and by water cooled surfaces, whereby any substantial decomposition of nitric oxide is prevented.

One of the objects of my present invention is to provide a separate high temperature furnace especially adapted to form nitric oxide in a pebble bed which is maintained at nitric oxide forming temperature by burning gas of combustion which contains substantially no free oxygen.

A further object is to provide a nitric oxide pebble bed furnace which is heated by fuel introduced at one end and burned with substantially theoretical air so that no nitric oxide is formed during the heating up cycle while fuel is being burned and heat is being stored in the pebbles, the gases of combustion substantially free of both nitric oxide and oxygen being removed at the other end and passed through the stack.

A further object of my invention is to form nitric oxide in this pebble bed furnace after it has been heated by introducing at the end of the pebble bed opposite where the fuel is introduced an equimolal mixture of nitrogen and oxygen, made by adding oxygen to air and recycled gas, whereby a high concentration of nitric oxide is obtained in the gas leaving the pebble bed and substantially free from gas of combustion.

A further object is to pass the nitric oxide containing gas through a cross-over passage from the high temperature furnace into a chilling furnace in which the gases pass through a shock chilling pebble filled annulus in which chilling is assisted by turbulent mixing in a restricted area with recycled moderately heated nitric oxide containing gas.

A further object is to regeneratively heat a centrally disposed pebble filled bed in the chilling furnace by passing through it on heating cycle, a surplus amount of air which has previously passed through the annular pebble bed of the chilling furnace and is not used for combustion in the high temperature nitric oxide furnace. When nitric oxide is being formed or during the so-called make cycle, a portion of the nitric oxide containing gas is recycled and passed through the centrally disposed pebble bed, thus receiving heat which in turn had been derived from the passage of surplus air in the opposite direction during the heating cycle. This results in heating the nitric oxide containing gas to about 2300° F., at which temperature it mixes with fresh nitric oxide containing gas coming from the high temperature furnace, thus almost instantaneously cooling the mixture to below the temperature at which nitric oxide is stable.

A further object is to obtain almost instantaneous chilling of the fresh nitric oxide containing gas with recycled nitric oxide containing gas while at the same time not creating temperature gradients severe enough to shatter the refractories of the chilling furnace.

A further object is to control the desired heat balance of the process by using water cooled heat absorbing surfaces which are remote from the high temperature furnace and are disposed in the chilling furnace, whereby the recycled nitric oxide containing gas may be maintained at approximately 2300° F. when being mixed with the fresh nitric oxide containing gas coming over from the heating furnace at a much higher temperature.

A further object is to utilize two pairs of furnaces, each pair containing one heating and one chilling furnace, so that a continuous stream of nitric oxide containing gas may be produced and delivered to the collecting system.

In the operation of my process and apparatus in the embodiment shown for the purpose of illustration, I pass a stream of gas containing oxygen and nitrogen, preferably in equimolal proportions, upwardly through the pebble bed of a high temperature reaction furnace. The temperature of the pebbles in the upper part of this furnace is maintained by cyclic down draft heating at a level in excess of 4000° F. and preferably as high as 4577° F. The nitric oxide containing gas issuing from the top of the reaction furnace, passes through a cross-over into the top of a pebble filled outer annulus of a chilling furnace, where it is turbulently mixed with the same gas recycled, which in turn has been regeneratively heated to a temperature in excess of 2000° F. in a centrally disposed pebble bed of the chilling furnace which is separated from the outer annulus by an annular wall of suitable refractory material. The chilled mixture is then passed downwardly through the pebbles which fill the outer annulus of the chilling furnace and finally issues from the bottom of the chilling furnace as finished nitric oxide containing gas at about 500° F. A portion of this gas is then recycled for chilling purposes by passing it upwardly through the centrally disposed pebble bed of the chilling furnace, as just described.

In heating the heating furnace, I withdraw air for combustion at about 2700° F. and in quantity substantially that theoretically required for combustion, from the top of the annulus of the chilling furnace and through the cross-over into the top of the heating furnace where fuel is introduced. This fuel fired with theoretical air at 2700° F. creates a very high temperature of about 4600° F., which easily maintains the pebbles in the upper part of the heating furnace at the desired nitric oxide forming level.

I prefer to fill both the high temperature reaction furnace and the chilling furnace throughout with uniformly graded large pebbles, 2-3 inches in size, but these sizes may be varied as desired. I may use one size of pebble in the high temperature reaction furnace, another in the annulus of the chilling furnace, and still another in the centrally disposed pebble bed of the latter furnace if desired, because each bed may be independently replenished at the top and withdrawn from the bottom as need may arise.

In former processes which depend upon symmetrical operation of the furnaces in order to make commercial concentrations of nitric oxide in the gases of combustion, it has been necessary to maintain not less than about 12 per cent by volume oxygen, preferably higher, remaining after burning the fuel. This required about 147 per cent surplus air over the requirements of combustion. In my present process, I use not over 15 per cent surplus air over the requirements of combustion and usually considerably less. In using 147 per cent surplus air in the prior art processes, all of the air for combustion must be preheated to about 3700° F. in order to maintain a theoretical flame temperature of about 4600° F. after allowing for dissociation of carbon dioxide and water. But by using only 15 per cent surplus air, or less, in my present process, it suffices to preheat the air to only about 2700° F. to maintain the same theoretical flame temperature of 4600° F.

I augment the chilling effect in the outer shock chilling annulus of the chilling furnace by forcing through the pebbles, or particles, therein on upstream, or heating cycle, almost twice the amount of air required for combustion. The use of this large amount of air on upstream, together with the cooling effect of the water cooled surfaces, restricts the maximum temperature of the upstream air to about 2700° F. This is necessary in order to maintain the desired rate of chilling in the make cycle, and is also sufficient to achieve a temperature of combustion of about 4600° F. in the pebble bed of the high temperature reaction furnace. This latter temperature may, however, be as low as 4000° F. while still yielding a concentration of nitric oxide of commercial value.

I use three chilling effects in the outer annulus of the chilling furnace, namely, (a) turbulent mixing of nitric oxide containing gas, which comes from the crossover from the high temperature reaction furnace, with recycled gas of the same composition but at a lower temperature, (b) transfer of heat from the nitric oxide containing gas to the pebbles in the outer annulus through which it moves downwardly at high velocity, and (c) abstracting heat from within the chilling furnace by water cooled surfaces which are provided to maintain the necessary heat balance of the process.

I prefer to use as the refractory particles, or pebbles, magnesia, zirconia, or other suitable refractory of high density substantially free from iron.

In the accompanying drawings which illustrate a preferred form or embodiment of my invention, Fig. 1 is a partial vertical cross-sectional elevation of a pair of furnaces consisting of one high temperature reaction furnace and one chilling furnace on make cycle.

Fig. 2 is a partial vertical cross-sectional elevation of a pair of furnaces consisting of one high temperature reaction furnace and one chilling furnace on heating cycle.

In the drawings, 10 represents a closed, cylindrical refractory lined vessel, which is referred to as the high temperature reaction furnace. This is lined with refractory and insulating lining 11, of a sufficient thickness to prevent serious loss of heat to the outside. The furnace is filled with refractory particles, or pebbles, 12, which rest on water cooled removable grate 13 at the bottom. This grate may be removed by devices not shown, so as to dump the entire load of pebbles at once, or they may be removed gradually. Fresh pebbles may be added through a working door 14, which is opened for this purpose, but is closed during the normal operation of the process. As all of the pebbles are introduced at the top and removed from the bottom in due time, they are of uniform sized grading throughout, except for any change in their size which may be caused by volatilization of the refractory under the influence of the very high temperature prevailing in the top portion of the furnace 10.

Pebbles introduced through 14 are preferably of 2–3 inches sizing, but may be somewhat larger than this. These pebbles tend to lose size by volatilization and are smaller at the bottom of the bed than at the top. This is advantageous because combustion occurs more readily in the bed of larger pebbles at the top, and the smaller pebbles at the bottom are better for heat transfer. The removal of pebbles through the grate 13 and one of the bottom openings of the furnace may be used to control the permeability of the bed.

A combustion space is represented by 15 and water cooled burner, or burners, preferably fired with natural gas, is represented by 16. On the heating cycle air for combustion at about 2700° F. enters through the refractory lined cross-over 17, and, mingling with the fuel in substantially theoretical amount for perfect combustion, heats the top of the pebble bed 12 and maintains about the top three feet thereof at the desired temperature for the formation of nitric oxide; then passing down through the pebbles at lessening temperature, it passes through the valve controlled outlet 18 at an average temperature of about 500° F. to the stack. This gas, because its theoretical air for combustion provided no free oxygen, is substantially barren of nitric oxide. The duration of the heating period is preferably about eight minutes. At the end of this outlet 18 is closed, thus isolating the furnace from the stack, burner 16 is shut off and inlet 19, previously closed is open, admitting air or a recirculating gas, and the latter, if used, preferably contains not more than about 6 per cent argon and other of the rare inert gases of the atmosphere which are built up in circulation. The balance of the circulated gas is an equimolal mixture of nitrogen and oxygen, which is maintained at this relative concentration, after stripping the formed nitric oxide in a suitable recovery system, not shown, by addition of air and oxygen. This gas is pumped at sufficient pressure to pass upstream through the pebbles in furnace 10, forming nitric oxide, so that it contains an appreciable concentration which may be in excess of 4 per cent upon issuing from the bed at its top.

It will be understood that if air is used instead of the equimolal mixture of nitrogen and oxygen, it is economical to discard the gas after the made nitric oxide has been stripped from it. The gas, when air is used, therefore, does not circulate and argon does not build up. On the other hand, if oxygen is used to enrich the air, the gases must be recirculated after stripping the nitric oxide for reasons of economy. When air is used instead of the equimolal mixture of nitrogen and oxygen, other things being equal, the concentration of nitric oxide formed in the gas is somewhat less than 3 per cent.

The gas issuing from the top of the pebble bed 12, passes on upstream through the combustion chamber 15, and thence through the cross-over 17 in reverse direction to the air flow during the heating cycle. The nitric oxide containing gas then passes to the top of the chilling vessel 20. The make period preferably lasts for about eight minutes, when the flow through the openings 18 and 19 are switched and the heating cycle repeated.

The chilling vessel 20 is a pressure tight vessel suitably lined with refractory and insulating material 21. The domed top 22 is connected with cross-over 17. Cylindrical wall 23 of refractory material defines the centrally disposed cylindrical space 24 and the inside diameter of the outer annular space. The outer annular space preferably has a larger outside diameter at the bottom than at the top. The pebbles in the larger outer annulus at bottom are used for recovery of heat from the down stream nitric oxide containing gas, which heat is in turn regeneratively transferred to the upstream air on heating cycle. The pebbles in the smaller outer annulus 25a, at the top, not only serve for assisting in the chilling, but also in providing turbulence and this latter function is improved by increasing the velocity of the downstream nitric oxide containing gas by restricting the cross-sectional area of the upper bed of the outer annulus.

The central and outer annular spaces are closed at the bottom by water cooled gas permeable grates 26. Centrally disposed cylindrical space 24 is open at top, communicating with a common space 27. The restricted outer annular space 25a and cross-over 17, also communicate with the common space 27.

Cylindrical space 24 is filled with uniformly graded refractory particles or pebbles 28. These are introduced through the working door 29 and rest on water cooled grate 26 at bottom. Outer annular spaces 25 and 25a are also filled with uniformly graded refractory particles 30, which are introduced through working door 31 and rest on grate 26. The pebbles from both outer annular spaces 25 and 25a and centrally disposed space 24, may be removed at will at bottom through grate 26 by any suitable device not shown. The pebbles in 24 and in 25 and 25a are uniformly graded in each space, but these grades need not be the same, although I ordinarily prefer to use the same grading of pebbles in both the annular and the centrally disposed spaces.

On the heating cycle, valves 32 and 34 are closed and valves 33 and 35 are open. Air at atmospheric temperature and under sufficient pressure to overcome the resistance of the furnaces enters through valve 33 and passes up through the pebbles in annular spaces 25 and 25a, emerging at the top at about 2700° F. That portion of this air needed for combustion, about 52 per cent, passes through the cross-over 17 into combustion space 15, where as above described, it supports combustion of fuel introduced through burners 16. The balance of this air at 2700° F., which is surplus over the requirements for combustion, passes downwardly through the pebbles in centrally disposed space 24, regeneratively heating the pebbles and leaving through open valve 35, at an average temperature of about 500° F., to the stack.

During the make cycle, valves 32 and 34 are open and valves 33 and 35 are closed. A portion of the nitric oxide containing gas which leaves through valve 32 is recycled and passes through valve 34, thence upwardly through the pebbles 28 and central space 24, issuing at the top at about 2300° F., where it mixes first in common space 27 with the very hot nitric oxide containing gas at 4000° F. or higher, coming into the cross-over 17 from the pebble bed 12 in the high temperature reaction furnace 10. This mixing causes extremely rapid reduction of temperature in the very hot nitric oxide containing gas, and this mixing and chilling is assisted by the fact that the mixed gas immediately enters the pebbles 30 in the restricted annular space 25a, passing downwardly at rapidly lowering temperature, thence through the enlarged outer annular space 25, and issuing through valve 32 at an average temperature of about 500° F. The stream is split at this point, a portion going on to a nitric oxide recovery system, such as shown for example in my copending application Serial No. 20,672, filed April 13, 1948, and the balance entering valve 34 as just described. This latter portion may have its temperature reduced to as low as 100° F. by any suitable cooling device not shown.

I have found that the heat balance of the system just described, if the recycled nitric oxide containing gas is to be heated to about 2000° F., or not over 2300° F., requires that heat be abstracted. This I preferably do by inserting water cooled surfaces 36 along the inside of the refractory wall 23.

Valves 18, 19, 32, 33, 34 and 35 all operate on gases which achieve a maximum temperature of about 700° F. It is therefor easy to maintain them and the entire process is controlled in an easy and effective manner by controlling the rate of flow of air and gases through these valves. I have illustrated each of these valves as separate, but it will be obvious that, because the motions are paired and synchronized, the operating mechanism for the valves may be mechanically interconnected in any suitable manner.

As an example, I may provide a high temperature furnace 10 for making 14.7 tons daily of nitrogen as nitric oxide with an internal diameter of 12 feet. The height of the bed of pebbles 12 may be 8 to 10 feet.

The over-all height of the high temperature reaction furnace is about 21 feet. For this same output, I may provide a chilling furnace 20 of about the same over-all height, the total depths of beds being about the same as in the high temperature reaction furnace, and of this depth, in the outer annulus, about 4 feet is preferably in the restricted portion at the upper part of the furnace. The inside diameter of the centrally disposed space 24 may be about 11 feet, and the external diameter about 13 feet. The internal diameter of the larger furnace shell at bottom may be 18 feet 6 inches and of the smaller furnace shell at top, 15 feet, defining with the annular wall of the central space, the enlarged and restricted outer annuli, respectively. The outside diameter of the high temperature reaction furnace may be 18 feet 6 inches, and the lower outside diameter of the chilling furnace, about 21 feet 6 inches, and the upper outside diameter, 18 feet.

As pointed out above, my process when fed on upstream making with an equimolal mixture of nitrogen and oxygen, must be operated in closed cycle with a recovery system so that the unused oxygen may be recirculated. The circulation must be bled to the extent of about 5 per cent, the bled portion being discarded, to keep down the concentration of the rare gases of the atmosphere, mostly argon. If a 5 per cent bleed is withdrawn, the argon concentration of remaining circulation will build up to a steady concentration of about 6.5 per cent.

The pure oxygen, or 95 per cent oxygen, is consumed in three ways in the closed cycle: (1) by combination of nitrogen and oxygen forming nitric oxide; (2) by loss through the bleed; and (3) by oxidation of nitric oxide to form nitrogen peroxide in the collecting or recovery system, which must be done completely to render the collection feasible. The first two losses of oxygen can be made up by supplying a mixture of equal volumes of nitrogen and oxygen which can be made by mixing air with 95 per cent commercial oxygen. In such a mix, 74.8 per cent of the total oxygen is added as the 95 per cent commercial grade. The third can only be made up by adding pure oxygen, but in practice the 95 per cent grade is acceptable. The net consumption of 95 per cent oxygen is about 3.1 pounds per pound nitrogen fixed as nitric oxide in the furnace discharge gas, amounting in the illustration given, to about 62.5 pounds per minute, or 702 S. C. F. M. The make up air amounts to 54.8 pounds per minute, or 680 S. C. F. M. These figures are based upon producing 4.6 per cent nitric oxide in the furnace discharge gas.

Since the cycle during formation of nitric oxide is entirely closed and is separated from the cycle during which the fuel is burned, the forming cycle can be maintained in an anhydrous condition by removing moisture from the make-up air and oxygen. The advantages of such a cycle are, of course, evident since any moisture which is produced in the make cycle has to be removed from the products of this cycle, along with the nitric oxide, and this places an added burden upon whatever recovery system is employed to remove the nitric oxide from the entire gaseous mixture.

I prefer to operate my process with the mass velocity mentioned below, as applying to the several parts of the apparatus. The mass velocity is defined as standard cubic feet per minute, measured at 32° F. at sea level, per square feet of cross-sectional area of the passage through which the gas is flowing:

|  | S. C. F. M. |
|---|---|
| Up and downstream in central space 24 of the chilling furnace | 100 |
| Downstream on make cycle in restricted outer annulus, 25a, of chilling furnace | 470 |
| Upstream on heating cycle in restricted outer annulus, 25a, of chilling furnace | 440 |
| Downstream on make cycle in lower outer annulus, 25, of chilling furnace | 115 |
| Upstream on heating cycle lower outer annulus, 25, of chilling furnace | 105 |
| Upstream on make cycle in high temperature reaction furnace 10 | 100 |
| Downstream on heating cycle, high temperature reaction furnace 10 | 92 |

The maintenance of the above listed mass velocities within the two furnaces of a unit, which, with a companion unit make 14.7 tons nitrogen daily as nitric oxide, results in about the following flows of gas or air through the several valves. These quantities are expressed as cubic feet per minute, while flow is occurring at the approximate temperatures and pressures prevailing:

| | |
|---|---|
| Valve 32, full flow of nitric oxide containing gas out on downstream make cycle at about atmospheric pressure and 500° F., average temperature, C. F. M. | 41,500 |
| Valve 33, air for combustion and excess supplied on upstream heating cycle at atmospheric temperature and about 2.5 p. s. i., C. F. M. | 17,500 |
| Valve 34, recycled nitric oxide containing gas on make cycle at average temperature 100° F., 2.6 p. s. i., C. F. M. | 9,100 |
| Valve 35, excess air to stack on heating cycle at about atmospheric pressure and 500° F. average temperature, C. F. M. | 18,300 |
| Valve 18, gas of combustion to the stack on heating cycle, about atmospheric pressure 500° F. average temperature, C. F. M. | 20,500 |
| Valve 19, equimolal mixtures of nitrogen and oxygen recycled on make cycle at about 350° F. at 2.5 p. s. i., C. F. M. | 15,500 |

The heating and making cycles of the furnace of my present invention are totally dissimilar from each other. The purpose of the heating cycle is to restore the reaction temperature to the particles in the high temperature reaction furnace. This is done by burning fuel with a relatively low surplus of air for combustion—not over 15 per cent and preferably less—at a relatively low temperature, namely, about 2700° F. Under these conditions the flame temperature, after allowing for dissocation, is about 4600° F., which is sufficiently high for forming over 5 per cent nitric oxide in an equimolal mix of oxygen and nitrogen. In passing upstream through about 2 feet of the particles in the upper part of the chamber 10, about 90 per cent of the equilibrium value of nitric oxide will be formed. But in passing downstream on heating cycle, the oxygen concentration in the gas of combustion is not more than about 2.5 per cent and preferably less, so that little nitric oxide is formed and because the particles with which the furnace is filled are 2–3 inches in size or even larger, there will be practically no shock chilling effect on the downstream, or heating cycle, and, therefore, of the little nitric oxide formed practically none will be preserved. The absence of nitric oxide in the gas of combustion is an important feature of my invention, because its presence even in relatively small amounts will necessitate costly collection because of the danger of discharging it into the atmosphere.

The upstream air entering the bed of the chilling furnace 20 on heating cycle at atmospheric temperature and about 2.5 p. s. i. ga., is regeneratively heated by particles in the lower outer annulus 25 and restricted upper annulus 25a, to about 2700° F. Almost half of this air is diverted to flow down through the central space 24 of chilling furnace 20, and the balance flows through the cross-over 17, furnishing the air for combustion of the fuel from the burners 16 in combustion space 15.

On make cycle, air, or the mixture of nitrogen and oxygen, is passed upwardly through the particles in the high temperature reaction furnace 10, becoming heated to nitric oxide forming temperature, and thence passes through the cross-over into the common chamber 27 and thence into the restricted outer annulus 25a. A part of the nitric oxide containing gas at an average temperature of 500° F. leaving the bottom of furnace 20, amounting to about 44 per cent of the total, is recycled preferably after cooling to about 100° F. in equipment not shown in the drawings, back to the bottom of the central space 24, whence it flows up through the particles with which this space is filled, and thence into common space 27 where it mixes with the hot nitric oxide containing gas from the cross-over and passes down through the restricted outer annulus 25a. This results in a reduction of temperature over the critical range of decomposition of nitric oxide, which is so rapid as to be almost instantaneous.

The gas mixture now at 3400–3600° F. flows down through the restricted annulus 25a and the lower outer annulus 25, and thence out from the furnace at an average temperature of about 500° F., thus completing the make portion of the cycle.

The make portion of the cycle, unlike the heating cycle which produces no nitric oxide, is designed to give the highest possible yield of nitric oxide, which may result from the temperature of operation in the high temperature reaction furnace and from the concentration of oxygen in the cycled gas. The total dissimilarity between the flow on making and flow on heating cycles is a novel feature of my present invention.

The restricted outer annulus 25a and the lower annulus 25 of the chilling furnace 20 combine the functions of a regenerative, or heating cycle upstream, when the flow of air comprising the air for combustion and excess is heated to about 2700° F. with the shock chilling action on make cycle when the flow is downstream. The temperature of about 2700° F. to which the air is heated on upstream is critical because if it becomes much lower than this, the temperature of combustion in the furnace 10 will suffer serious reduction; and, if, on the other hand, it gets much higher, shock chilling efficiency will suffer. The temperature of 2700° F. for the air for combustion is associated with the highest level of operating temperature, namely, 4577° F. I have pointed out that operating temperatures as low as 4000° F. may be successfully used, and if this be the case, the temperature of the air for combustion may be somewhat lower. This, in turn, will increase the shock chilling effect and make the preservation of most of the nitric oxide which is formed in the high temperature reaction furnace easier.

The heat balance of the process, in order that the air for combustion be not heated to more than 2700° F. nor the recycled nitric oxide containing gas used for chilling to more than about 2300° F. requires that heat be removed from the system. This could be done by using a greater amount of excess air, or withdrawing thhe excess air from the furnace at a higher temperature. But I prefer to control the withdrawal of heat in a more efficient and direct manner by the use of water cooled heat transfer surfaces in furnace 20, as illustrated by the cooling coils 36. I prefer to introduce water to these coils at 300 p. s. i. and to recover the heat withdrawn with this water by passing it to a flash boiler not shown in the drawing. The amount of water employed in making 14.7 tons nitrogen daily as nitric oxide is about 168 G. P. M. The importance of this step will be emphasized by considering that the amount of heat withdrawn amounts to about 16,700 B. t. u. per pound of nitrogen fixed as nitric oxide, and that this is about 40 per cent of the total heat required in the fuel fired in burner 16. In a unit comprising two pair of furnaces producing 14.7 pounds of nitrogen daily, this abstraction of heat amounts to about 20 million B. t. u./hr. It will be apparent that this equivalent result might be obtained as indicated above by restricting the regenerative effect of the central space 24 and discharging excess air to the stack at a high temperature through valve 35. However, one of the principal advantages of my process is that all of the valves are designed to handle relatively cool gas or air and the discharge of excess air at a high temperature from the furnace would eliminate this advantage. This would also result in high temperature differences between the recycled gases and refractories, which would tend to cause spalling and deterioration. I might also, as indicated above, effect the necessary additional heat abstraction required by the heat balance, at least in part, by introducing a greater amount of air on the heating cycle through valve 33, while sending the same amount through 17 to the reaction furnace, the entire surplus of air as before passing down through 24 and out through valve 35. A limiting factor in this variation is that the temperature of the air passing through 17 may not be unduly lowered so as to lower the temperature of reaction much if any below 4,000° F.

While for convenience of illustration and description, I have shown and described the gases as flowing upward through furnace 10 and downward through the chilling furnace 20 on the make period of the cycle and in the opposite direction during the heating portion of the cycle, it will be understood that the direction of flow can be reversed by reversing the position of the furnaces illustrated in Fig. 1 so as to place the cross-over connection 17 at the bottom of the furnaces and the outlet and inlet stacks at the top. It will also be understood that horizontal instead of vertical furnaces may be used, that one chilling furnace may be connected with two or more reaction furnaces and vice versa, and that various other modifications and changes may be made without departing from the spirit of my invention or the scope of the following claims.

I claim:

1. In the process for making nitric oxide substantially free from gas of combustion from a gas containing nitrogen and oxygen, the steps of passing the said gas through a first bed of refractory particles maintained in a make zone at nitric oxide forming temperature and rapidly chilling said formed nitric oxide by continuing the flow through a second bed of refractory particles at a lower temperature located in a cooling zone in communication with but removed from said make zone, removing the nitric oxide containing gas, then reversing the flow, passing air through the second mentioned bed in excess of the requirements for the combustion of fuel in said first bed to cool the particles in said second bed, removing most of the surplus air before it enters the first mentioned bed, burning fuel with the balance of said air in substantially theoretical quantity for its complete combustion in said first bed to maintain the temperature of the said first mentioned bed at nitric oxide forming level, while forming substantially no nitric oxide therein, passing the gas of combustion on through the particles in the said first bed and to the stack at reduced temperature.

2. In the process for making nitric oxide substantially free from gas of combustion from a gas containing nitrogen and oxygen, the steps of passing the said gas through a first bed of refractory particles maintained in a make zone at nitric oxide forming temperature and rapidly chilling said formed nitric oxide by continuing the flow through a second bed of refractory particles at a lower temperature located in a cooling zone in communication with but removed from said make zone, removing the nitric oxide containing gas, then reversing the flow, passing air through the second mentioned bed in excess of the requirements for the combustion of fuel in said first bed to cool the particles in said second bed, removing most of the surplus air before it enters the first mentioned bed, burning fuel with the balance of said air in substantially theoretical quantity for its complete combustion in said first bed to maintain the temperature of the said first mentioned bed at nitric oxide forming level, while forming substantially no nitric oxide therein, passing the gas of combustion on through the particles in the said first bed and to the stack at reduced temperature, and regeneratively recovering heat from the said surplus air in a third pebble bed.

3. The method of making nitric oxide which comprises heating a mixture of nitrogen and oxygen to nitric oxide forming temperature in a first make zone, passing the resulting nitric oxide containing gas into a second cooling zone in communication with but removed from said make zone, chilling a substantial quantity of said gas in said second zone with gas of substantially the same composition, recovering nitric oxide from a portion of said chilled gas and recirculating a portion of said chilled gas through the second zone to chill further nitric oxide containing gas at nitric oxide forming temperature, discontinuing the making of nitric oxide and using the second zone to preheat air, passing said preheated air to said first zone, burning fuel with said preheated air in the first zone to restore said zone to nitric oxide forming temperature, discarding the combustion gases from said first zone and after said first zone has been restored to nitric oxide forming temperature repeating the cycle.

4. The method of making nitric oxide which comprises passing a mixture of nitrogen and oxygen through pebbles heated to nitric oxide forming temperature in a first make zone, passing the resulting nitric oxide containing gas into a second cooling zone in communication with but removed from said make zone, chilling said gas in said second zone with a substantial quantity of a gas of substantially the same composition, flowing said gases through pebbles in said second zone to extract heat therefrom, recovering nitric oxide from a portion of said chilled gases and recirculating a portion of said chilled gases through said second zone to chill further nitric oxide containing gas at nitric oxide forming temperature, discontinuing the making of nitric oxide in said first zone, passing air through the heated pebbles in the second zone to preheat the air, passing a part of said preheated air to said first zone, burning fuel with said part of said preheated air in said first zone to restore said zone to nitric oxide forming temperature, discarding the combustion gases from said first zone, and after said first zone has been restored to nitric oxide forming temperature repeating the cycle.

5. The method of producing nitric oxide from gaseous mixtures of nitrogen and oxygen, which comprises passing said mixtures in one direction only through a bed of refractory particles in a pebble bed make zone, which have been heated to a high temperature at which nitrogen and oxygen react to form nitric oxide, and immediately thereafter cooling said highly heated gaseous reaction mixture by mixing the same with a substantial quantity of a chilling gas at a lower temperature containing substantially the same concentration of nitric oxide in a second cooling zone in communication with but removed from said make zone and causing further mixing of said two gases by passing the same through interstices in a bed of refractory particles in said second zone and at a lower temperature than the refractory particles in said first zone and recovering the nitric oxide so produced, and restoring the heat to said first bed of refractory particles and cooling said second bed of refractory particles by passing air through the refractory particles in said second zone in reverse direction to the previous flow of gases therethrough, passing part of the air from the said bed of refractory particles in said second zone through the bed of refractory particles in said first zone and heating the first bed of refractory particles therein by burning a fuel therein supported by air coming from said second zone and discarding the gases formed in said first bed of refractory particles during the heating operation.

6. The method of claim 5 in which the amount of air passed through the bed of refractory particles in said make zone during the heating thereof contains not more than 15 per cent in excess of that required for combustion of said fuel.

7. The method of producing nitric oxide from gaseous mixtures of nitrogen and oxygen, which comprises passing said mixtures in one direction only through a bed of refractory particles of more than 2 inches average diameter, in a first make zone which has been heated to a high temperature at which nitrogen and oxygen react to form nitric oxide, and immediately thereafter cooling said highly heated gaseous reaction mixture by passing said mixture into a second cooling zone in communication with but removed from said make zone and mixing the same with a substantial quantity of a chilling gas at a lower temperature containing substantially the same concentration of nitric oxide and causing further mixing of said two gases by passing the same through interstices in a bed of refractory particles of more than 2 inches average diameter in said second zone and at a lower temperature than the refractory particles in said first zone and recovering the nitric oxide so produced, and in restoring the heat to said bed of refractory particles in said first zone and cooling said bed of refractory particles in said second zone by passing air through said zones in reverse direction to the previous flow of gases therethrough, passing more air through said second zone than is passed through said first zone, heating the bed of refractory particles in said first zone by burning fuel with the heated air coming from the second zone and discarding the combustion gases substantially free of nitric oxide formed in said first zone during the heating operation, passing the excess of air which flows through said second zone through another bed of refractory particles in proximity to said second zone, and passing the chilling gas in reverse direction through said other bed and into the stream of highly heated gases from said first zone during the nitric oxide forming reaction.

8. A process for making nitric oxide from gas containing nitrogen and oxygen, comprising the steps of passing a stream of said gas in one direction through a bed of refractory particles in an enclosed pressure-tight make zone, whereby the said gas is first preheated to nitric oxide forming temperature and maintained at that temperature for sufficient time to arrive at a substantial equilibrium concentration of nitric oxide in a reacted gas, then passing said nitric oxide containing gas to a second cooling zone in communication with but removed from said make zone and turbulently mixing the gas with a substantial quantity of a recycled nitric oxide containing gas at lower temperature in a bed of particles of restricted cross-sectional area in said second zone to chill the first named gas almost instantaneously to about 3400 to 3600° F., then passing the mixed gas through particles in another bed of enlarged cross-sectional area in said second zone to cool same to approximately 500° F., then passing a stream of air through the second zone in opposite direction during a heating period, first through the last mentioned other bed of enlarged cross-sectional area, then through said restricted chilling bed, then passing a portion of said air to said first zone, adding fuel for combustion in the first zone to heat said zone to nitric oxide forming temperature, and then passing the gas of combustion through said first zone, and discharging it to the stack, substantially free of nitric oxide.

ROBERT D. PIKE.

References Cited in the file of this patent

UNITED STATES PATENTS

| Number | Name | Date |
|---|---|---|
| Re. 19,757 | Royster | Nov. 12, 1935 |
| 777,485 | Pauling | Dec. 13, 1904 |
| 882,958 | Pauling | Mar. 24, 1908 |
| 2,121,733 | Cottrell | June 21, 1938 |
| 2,408,282 | Wolf | Sept. 24, 1946 |
| 2,421,744 | Daniels et al. | June 10, 1947 |
| 2,422,081 | Cottrell | June 10, 1947 |
| 2,512,259 | Pike | June 20, 1950 |
| 2,548,002 | Daniels | Apr. 10, 1951 |

FOREIGN PATENTS

| Number | Country | Date |
|---|---|---|
| 18,475 of 1910 | Great Britain | Aug. 4, 1910 |